June 6, 1967 J. J. STONE 3,324,346

CHARACTER GENERATOR SYSTEM

Filed Jan. 28, 1964

INVENTOR.
JOSEPH J. STONE
BY Samuel Lindenberg
ATTORNEY 3,324,346
Patented June 6, 1967

3,324,346

CHARACTER GENERATOR SYSTEM

Joseph J. Stone, Glenview, Ill., assignor to A. B. Dick Company, Chicago, Ill., a corporation of Illinois Filed Jan. 23, 1964, Ser. No. 340,685
6 Claims. (Cl. 315—11)

This invention relates to systems for electronically generating character representative signals and more particularly to improvements therein.

Character generating systems have been developed which employ a cathode ray tube or flying spot scanner as a controllable light source for selectively illuminating a predetermined character on a film transparency having a large number of these characters. The cathode ray beam after being deflected to the location desired to be illuminated is further deflected to provide a scanning raster whereby the selected character is scanned. On the side of the film transparency opposite to the illuminated side a photocell is usually placed which, in response to the modulated light signals which are generated provides video signals. These video signals are subsequently reproduced as the original characters which however are positioned properly with other characters, generated in a similar manner, in order to represent the intelligence derived from the source of signals for selecting the predetermined characters.

Another arrangement for generating video signals representative of a character is to provide a flood light which illuminates the entire film transparency with the characters thereon. An image dissector tube receives the light which passes through the transparency. By applying proper selecting and scanning vertical and horizontal signals to the deflection yoke of the image dissector tube, only the signals from one of the characters which illuminates the total cathode of the image dissector tube is allowed to pass through the aperture of the image dissector tube for the purpose of creating a video signal.

The resultant video signals which are derived, in accordance with the above, are usually displayed as alphanumeric information on the face of a high resolution cathode ray tube which is then recorded photographically. Full page composition is usually contemplated by creating the display on the face plate of the cathode ray tube over a rectangular area proportional in size and aspect ratio to that of the desired page, and utilizing a stationary film plate over which the film is advanced in a page by page manner. In such an arrangement the required resolution of the display cathode ray tube is a function of the diagonal of the image page area. Thus to meet the requirement of 500 lines per inch resolution and an 8 x 10½ inch page format, a cathode ray tube, having approximately 6500 lines resolution would be required.

An alternative approach is to create a display across the center line of a cathode ray tube face plate, and to advance the film on which this line is being recorded on a line by line basis. The cathode ray tube resolution requirement in such an arrangement is reduced to about 4000 lines. In either case, to achieve distortion free displays at the desired speeds and accuracy, the characteristics of the deflection system become highly critical, and the substantially continuous necessity for position alignment of the display system presents problems of complexity and expense.

While cathode ray tubes providing resolution characteristics in the range of 500 to 1000 lines are available from commercial sources, cathode ray tubes having a 4000 or a 6500 line per inch resolution, are custom engineered and are expensive. These are usually made only on a custom-engineered basis and their performance reliability is not guaranteed.

An object of this invention is the provision of the novel and unique system for generating character representative signals.

Still another object of the present invention is the provision of an arrangement for producing graphic arts type resolution in a system of the type generally described previously herein using low resolution and readily available components.

Yet another object of the present invention is the provision of an inexpensive system for providing signals representative of characters with a resolution heretofore obtainable only from specially designed expensive systems.

Another object of the present invention is an arrangement for generating character representative video signals which provides a minimum of maintenance problems.

These and other objects of the present invention may be achieved in a system wherein there is employed a character matrix comprising a transparency which has a plurality of alphanumeric character matrices thereon. A low resoution cathode ray tube is employed as a light source. Between the cathode ray tube and the transparency containing the character matrices there is positioned a lens assembly. This lens assembly contains a plurality of lenses such that when the cathode ray beam is positioned for illuminating a particular character in a matrix with a scanning raster, every character similarly positioned in all of the matrices are so illuminated. On the side of the transparency opposite to the one which is illuminated from the cathode ray tube, there is positioned a lens which collects the light from all of the illuminated characters and directs it at the photocathode of an image dissector tube. The aperture of the image dissector tube is sized to permit the light from a single matrix of characters to pass therethrough. Signals are applied to the deflectors of the image dissector tube so that only the light from the predetermined one of the matrices will pass through the image dissector tube aperture. Since only a single one of the characters in this character matrix is illuminated, the mechanism selects a predetermined one of the characters of the transparency. The image dissector tube can then generate video signals which are applied to subsequent utilization apparatus for reproduction.

The relatively high resolution requirements previously discussed are met by this system by the use of the multiple lenses which eliminate the need for high performance tubes and deflection systems, and which permits the use of components that are well within the state of the art.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
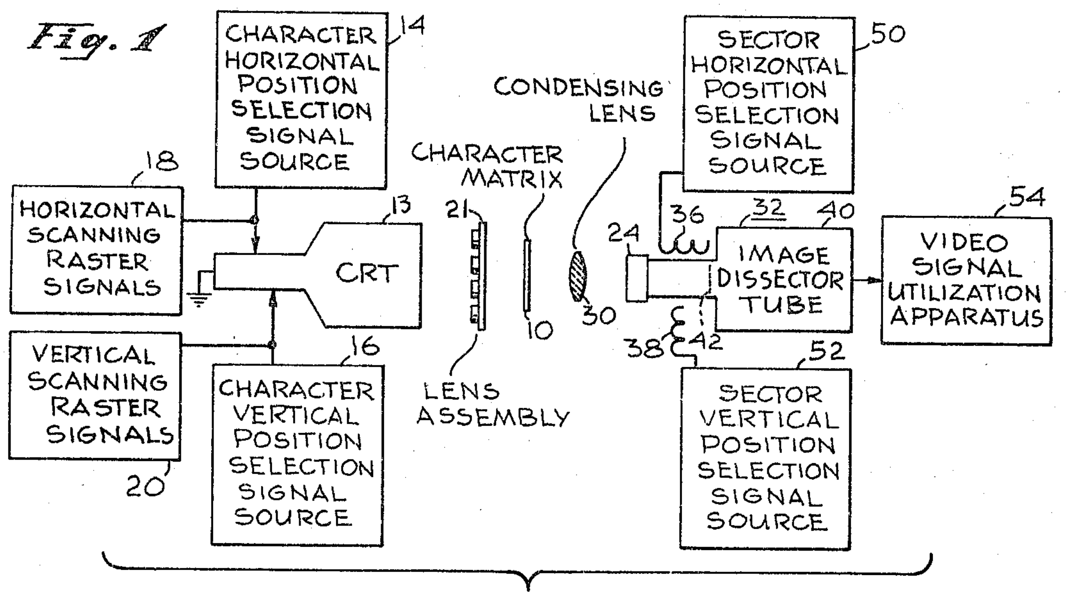
FIGURE 1 is a block schematic diagram of the embodiment of the invention.
Figure 2:
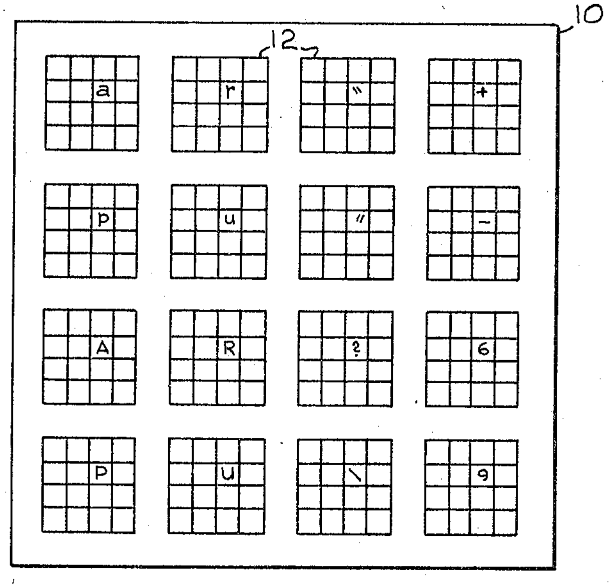
FIGURE 2 is illustrative of a typical character matrix transparency which may be employed with the embodiment of the invention.

Referring now to FIGURE 1 there may be seen a block schematic diagram of an embodiment of this invention. Graphic arts applications require character matrices of 256 character positions (16 x 16) and resolutions sufficient for 250 line pairs per inch for characters reproduced in 18 point or larger sizes. Accordingly, by way of illustration and not by way of limitation, it will be assumed that a character matrix 10 is employed with this system which has the requisite number of characters disposed in a 16 x 16 character matrix, as is represented in FIGURE 2. Each matrix 12, has 16 character positions, represented by the small boxes in each one of the matrices 12.

In accordance with this invention a conventional cathode ray tube 13 is used to make a first selection of a desired character. The cathode ray tube 13 has applied thereto horizontal and vertical deflection signals from respective character horizontal position selecting signal source 14 and character vertical position selecting signal source 16. These signals serve to direct the cathode ray beam to a predetermined one of the 16 character positions in a matrix 12. Superimposed on the position selecting signals are horizontal scanning raster signals and vertical scanning raster signals from the respective sources 18, 20, as a result of which, the cathode ray beam is positioned at a location and scans the region of that location. Techniques and apparatus for applying selecting and raster scanning voltages to a cathode ray tube to effectuate the operation described are well known and accordingly the details thereof will not be described here. The character selecting deflection voltages, which are usually analog voltages, may be derived in well known manner from digital signals which are provided from a computer. The cathode ray beam of the cathode ray tube need only be placed in one of sixteen discrete positions of a 4 x 4 array for selecting the desired character.

Figure 3:
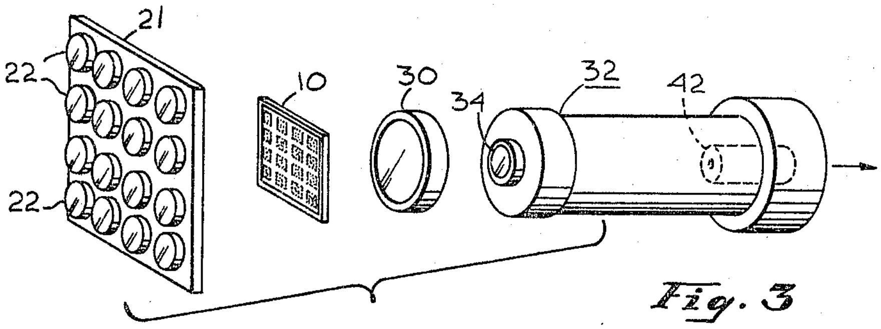
FIGURE 3 is an isometric view illustrating in more detail the components which are employed in accordance with this invention.

The light output of the cathode ray tube, which is a small character scanning raster, is applied to the lens assembly 21. As may be seen in FIGURE 3 the lens assembly 21 consists of 16 reducing lenses 22 which are positioned and arranged so that the light falling thereon from the cathode ray tube face causes scanning rasters to cover the identically located character in each one of the matrices 12 on the character matrix 10 in accordance with the location of that scanning raster on the cathode ray tube face. The lenses are selected so that each one produces a reduced image of the cathode ray tube face in the plane of the film transparency over the region of a different matrix 12. Thus, as shown in FIGURE 2, each of the characters or symbols which are positioned in each one of the matrices 12 in the rectangle which is third from the bottom and third from the left in the drawing will be illuminated by a scanning raster in response to a single scanning raster illuminating the face of the cathode ray tube. Accordingly a set of 16 light images is established by the arrangement described, all of which fall on a condensing lens 30. The condensing lens 30 applies these images to the photocathode 34 of an image dissector tube 32.

The image dissector tube, as is well known, comprises a tube having a photocathode 34, a horizontal deflection yoke 36 and a vertical deflection yoke 38. These deflection yokes operate in response to signals applied thereto to deflect the electrons which flow from the photocathode toward the photomultiplier portion 40 of the tube so that only electrons from a predetermined region of the photocathode can pass through an aperture in an aperture plate 42 which is in front of the photomultiplier portion of the tube.

The aperture of the aperture plate 42 is made large enough to accept any electrons which may be derived over the region covered on the photocathode by a single matrix. Selection of the one of all of the matrices 12 is achieved by signals from a sector horizontal position selection signal source 50, which is connected to the horizontal deflection yoke 36, and by signals from a sector vertical position selection source 52, which is connected to the vertical deflection yoke 38. Since only a single character or symbol is illuminated in the selected sector, then the image dissector tube will produce a video signal output corresponding to the selected one of the 16 illuminated character regions. These video signals are applied to a video signal utilization apparatus 54 for subsequent display in juxtaposition with other character representative video signals to form intelligence which is then photographed.

The deflection signals for the image dissector tube may also be derived from digital signals in well known manner from a source, not shown, such as the output of a digital computer.

In summarization of the operation of this system, a cathode ray tube scanning raster light pattern is imaged on the film transparency by a set of 16 lenses. Each lens produces an image corresponding to the scanning raster light image of the cathode ray tube. The cathode ray tube light image is positioned so that it illuminates a predetermined one of 16 characters in each one of the 16 matrices which are provided by the film transparency. An imaging lens projects the modulated lights from the film transparency onto the photo-emissive surface of an image dissector tube. Predetermined vertical and horizontal deflection signals applied to the image dissector tube permits the entire emission from only one of the 16 sectors to enter the photomultiplier section of the image dissector tube and to produce a video output. This is facilitated by making the size of the acceptance aperture to the photomultiplier portion of the image dissector tube only large enough to pass all of one sector and to reject the rest.

There has been described and shown herein a novel, useful and relatively inexpensive generating system which can provide graphic arts quality. This system is simple to operate as well as to maintain. The components which are employed are readily available and the operation thereof is also well known. The film matrix can be easily and quickly replaced either manually or by automatic means where required. The scanning raster light image of the cathode ray tube need only be placed in one of 16 discrete positions of a 4 x 4 array on the cathode ray tube face plate and therefore the requirements for deflection are simple. Similarly the image dissecting tube need only select one of sixteen sectors on the photocathode which are arranged in a 4 x 4 array. The principal purpose of the lens assembly is to provide a demagnified image of the cathode ray tube spot, thus obviating the necessity for a display cathode ray tube of critically high resolution characteristics and eliminating the need for frequent electronic alignment procedures.

I claim:

1. A character signal generating system comprising a film transparency having thereon a plurality of characters disposed thereover in a plurality of matrices, means for selectively illuminating a similarly positioned character in each of said plurality of matrices, an image dissector tube having a photocathode, a photomultipler section spaced from said photocathode, a plate having an aperture therein, said plate being positioned between said photocathode and photomultipler section, and deflecting means for directing only electrons from a predetermined sector of said photocathode to the aperture in said plate, means for directing the light images established by said means for selectively illuminating upon said photocathode, and means for applying deflecting signals to the deflecting means of said image dissector tube for directing the electrons produced in response to the light image in a predetermined sector of said photocathode to pass through the aperture of said plate to the photomultiplier portion of said tube.

2. Apparatus for generating video signals representative of a character comprising a transparency having a plurality of character images thereon disposed in a plurality of arrays, means for illuminating a similarly positioned character in each of said plurality of arrays including a cathode ray tube positioned adjacent one side of said transparency, an array of image reducing lenses positioned between said cathode ray tube and said transparency, there being a lens in said array for each one of said arrays on said transparency, said cathode ray tube including a cathode ray beam, a cathode ray screen on which said beam impinges to produce light, and means for deflecting said cathode ray beam for producing a light scanning raster at a location on said screen which is imaged by said array of lenses upon a similarly positioned character in each one of said arrays to illuminate said similarly positioned characters, and means positioned to receive the light images of the similarly positioned illuminated characters of said transparency including means for generating video signals representative of a single one of said illuminated characters.

3. The apparatus recited in claim 2 wherein said means for receiving all of said illuminated characters from said transparency comprises an image dissector tube including a photocathode upon which all of said light images fall, said photocathode including a photomultiplier section, spaced from said photocathode, a plate between said photomultiplier section having an aperture therethrough, and deflecting means for deflecting the electrons emitted from a predetermined sector of said photocathode toward said photomultiplier section to enable only the electrons resulting from stimulation of said photocathode by a predetermined one of said illuminated characters.

4. Apparatus as recited in claim 3 wherein each different sector of said photocathode is associated with a different one of said character arrays on said trnasparency, and said aperture in said plate is dimensioned to pass electrons from an area of said photocathode which is substantially the size of an area associated with one of said character arrays.

5. In apparatus of the type wherein a cathode ray tube is employed to provide a light scanning raster for illuminating a predetermined one of a plurality of characters on a character image transparency and means are provided for generating a video signal in response to the modulated light signals derived from said transparency, the improvement comprising a lens array including a plurality of lens means interposed between said transparency and said cathode ray tube for directing the light scanning raster from said cathode ray tube at a plurality of characters on said transparency and said means for providing a video signal responsive to the modulated light derived from such transparency includes a means for selecting the modulated light from a predetermined one of said plurality of characters which is illuminated through said lens array.

6. In a system of the type wherein a cathode ray tube is employed for generating and selectively positioning a light scanning raster for illuminating a predetermined one of a plurality of characters on an image transparency, and a means is provided for generating video signals responsive to the modulated light derived from the illuminated character on said transparency, the improvement comprising an image transparency having the characters thereon disposed in an array of matrices, an array of lenses positioned between said cathode ray tube and transparency, there being a lens in said array for each one of said matrices, said lenses being of the reducing type and being positioned relative to said transparency for illuminating a similarly positioned character positioned in each one of said array of matrices with the light from said cathode ray tube to produce light images, image dissector tube means, means for directing all of the image transparency light images to said image dissector tube means, and means in said image dissector tube means for generating video signals responsive to a single predetermined one of said light images.

References Cited

UNITED STATES PATENTS

| | | | |
|---|---|---|---|
| 2,859,427 | 11/1958 | McNaney | 340—149 |
| 2,984,750 | 5/1961 | Herriott | 340—324 X |
| 3,078,342 | 2/1963 | Kegelman | 178—6.8 X |

DAVID G. REDINBAUGH, *Primary Examiner.*

T. A. GALLAGHER, *Assistant Examiner.*